US010474713B1

United States Patent
Kim et al.

(10) Patent No.: US 10,474,713 B1
(45) Date of Patent: Nov. 12, 2019

(54) LEARNING METHOD AND LEARNING DEVICE USING MULTIPLE LABELED DATABASES WITH DIFFERENT LABEL SETS AND TESTING METHOD AND TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/171,811

(22) Filed: Oct. 26, 2018

(51) Int. Cl.
G06F 16/583 (2019.01)
G06T 7/174 (2017.01)
G06K 9/62 (2006.01)
G06N 3/08 (2006.01)

(52) U.S. Cl.
CPC ....... *G06F 16/5838* (2019.01); *G06K 9/6272* (2013.01); *G06N 3/084* (2013.01); *G06T 7/174* (2017.01)

(58) Field of Classification Search
CPC ... G06F 16/5838; G06T 7/174; G06K 9/6272; G06N 3/084
See application file for complete search history.

(56) References Cited

PUBLICATIONS

Dai, Jifeng, Kaiming He, and Jian Sun. "Boxsup: Exploiting bounding boxes to supervise convolutional networks for semantic segmentation." Proceedings of the IEEE International Conference on Computer Vision. 2015. (Year: 2015).*
Girshick, Ross, et al. "Region-based convolutional networks for accurate object detection and segmentation." IEEE transactions on pattern analysis and machine intelligence 38.1 (2016): 142-158. (Year: 2016).*

* cited by examiner

*Primary Examiner* — Eric Nilsson
(74) *Attorney, Agent, or Firm* — Xsensus, LLP

(57) ABSTRACT

A method for learning convolutional neural network (CNN) by using a plurality of labeled databases having different label sets provided. The method includes steps of: a learning device (a) establishing databases for training, respectively including image data sets by categories, and GT label sets by the categories, if each of the objects corresponds to a class belonging its corresponding category, each information annotated as its corresponding class to the object, wherein the GT label sets correspond to the image data sets; (b) receiving, as an input image, a specific image belonging to a specific image data set corresponding a specific class among the databases for training, and generating a feature map, and then generating classification results, by the categories, corresponding to a specific object included in the input image based on the feature map; and (c) learning parameters of the CNN by using losses by the categories.

26 Claims, 7 Drawing Sheets

FIG. 3
(PRIOR ART)
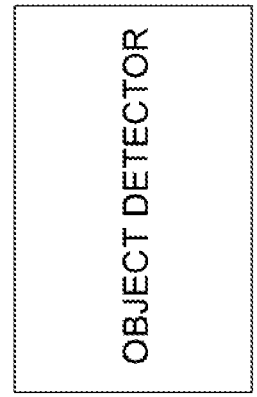
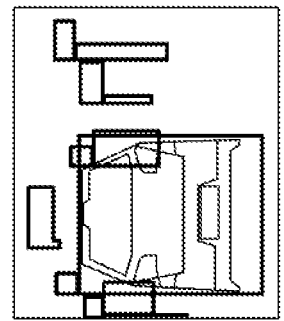
- CAR
- PERSON
- RIDER
- TRAFFIC SIGN
- TRAFFIC LIGHT
- DOG
- CAT
- DEER
- BACKGROUND

US 10,474,713 B1

LEARNING METHOD AND LEARNING DEVICE USING MULTIPLE LABELED DATABASES WITH DIFFERENT LABEL SETS AND TESTING METHOD AND TESTING DEVICE USING THE SAME

FIELD OF THE INVENTION

The present invention relates to a learning method using multiple labeled databases with different label sets; and more particularly, to a method for learning convolutional neural network (CNN) by using a plurality of labeled databases having different label sets, including steps of: (a) establishing a first to an n-th databases for training, respectively including (i) image data sets by categories, which are obtained by classifying images for a plurality of classes of a plurality of objects by the categories, and (ii) ground truth (GT) label sets by the categories, which are generated by checking each of the objects in each of the images included in each of the image data sets and by granting, if each of the objects corresponds to a class belonging to its corresponding category, each information annotated as its corresponding class to each of the objects, wherein each of the GT label sets corresponds to each of the image data sets; (b) receiving, as at least one input image at least one specific image belonging to a specific image data set corresponding to a specific class among the n databases for training, and generating at least one feature map by applying at least one convolution operation to the input image, then generating classification results, by the categories, corresponding to at least one specific object included in the input image based on the feature map, wherein the input image includes the specific object corresponding to the specific class; and (c) learning at least one parameter of the CNN by using losses by the categories, which are obtained by referring to the classification results by the categories and their corresponding CT values of the GT label sets by the categories, and a learning device, a test method, and a test device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer may classify it as a dog.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are the heart of the remarkable development in deep learning. CNNs have already been used in the 90's to solve the problem character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in a bounding box. Segmentation is a method for distinguishing a region of a specific object from other objects in a photograph. As the deep learning has recently become popular, the classification, the detection, and the segmentation are using the deep learning heavily.

FIG. 2 is a diagram schematically illustrating a detection method by using the CNN.

By referring to FIG. 2, the learning device receives an input image and applies a plurality of convolution operations to the input image through a plurality of convolutional filters (or convolutional layers) to thereby generate at least one feature map. Then, the learning device allows the feature map to pass through a detection layer to thereby generate at least one bounding box, and then allows the bounding box to pass through the filtering layer to thereby generate a final detection result. Thereafter, backpropagation is performed by using a loss value obtained by referring to the detection result and its corresponding a ground truth (GT) value which has been annotated by a person in advance to thereby allow a detector (i.e., the CNN learning device) to gradually make the detection result value get closer to the GT value.

Herein, the performance of the learned detector may be somewhat proportional to size(s) of database (s) for training.

In the conventional learning method, as shown in FIG. 3, an image database to be used for learning process stores a plurality of GTs in which all classes to be detected are annotated.

However, according to this conventional learning method, if a new class such as "traffic light" and "traffic sign" needs to be additionally learned on condition that the existing classes have been learned, all objects corresponding to the new class should be searched and annotated for all existing training images in the existing database. Further, newly-added training images other than the existing training images should be annotated for all the existing classes as well as the new class, resulting in an inefficiency of the learning

SUMMARY OF THE INVENTION

It is an object of the present invention to solve all the aforementioned problems.

It is another object of the present invention to provide an efficient learning method when a new class to be learned is added.

It is still another object of the present invention to provide a method for additionally learning a new class while not affecting the already learned parameters and reducing the learning costs and time through a separated database for the new class.

In accordance with one aspect of the present invention, there is provided a method for learning convolutional neural network (CNN) by using a plurality of labeled databases having different label sets, including steps of: (a) a learning device establishing a first to an n-th databases for training, respectively including (i) image data sets by categories, which are obtained by classifying images for a plurality of classes of a plurality of objects by the categories, and (ii) ground truth (GT) label sets by the categories, which are generated by checking each of the objects in each of the images included in each of the image data sets and by granting, if each of the objects corresponds to a class belonging to its corresponding category, each information annotated as its corresponding class to each of the objects, wherein each of the GT label sets corresponds to each of the image data sets; (b) the learning device receiving, as at least one input image, at least one specific image belonging to a specific image data set corresponding to a specific class among the n databases for training, and generating at least one feature map by applying at least one convolution operation to the input image, then generating classification results, by the categories, corresponding to at least one specific object included in the input image based on the feature map, wherein the input image includes the specific object corresponding to the specific class; and (c) the learning device learning at least one parameter of the CNN by using losses by the categories, which are obtained by referring to the classification results by the categories and their corresponding GT values of the GT label sets by the categories.

As one example, at the step of (c), the learning device calculates classification losses by the categories by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background.

As one example, at the step of (b), the learning device further obtains a box result which represents information on a detected location of the specific object, wherein, at the step of (c), the learning device further calculates a box loss by referring to the box result and its corresponding GT box, to thereby perform backpropagation.

As one example, at the step of (b), the learning device further obtains a box result which represents information on a detected location of the specific object, wherein, at the step of (c), if it is determined that the box result overlaps with a GT box by a determined threshold or more, the learning device calculates a box loss by referring to the box result and its corresponding GT box, and calculates the classification losses by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background, and wherein, at the step of (c), if it is determined that the box result overlaps with the GT box by less than the predetermined threshold, the learning device calculates a specific classification loss, which is obtained by referring to (i) the specific classification result corresponding to the specific GT label set including the annotation information on the specific class among the classification results by the categories and (ii) its corresponding GT value within the specific GT label set, to thereby allow backpropagation to be performed to learn the parameter of the CNN so that the specific classification result is classified as the background.

As one example, the predetermined threshold represents a condition that an I.O.U (intersection over union) is 0.5.

As one example, at the step of (C), if it is determined that the box result overlaps with the GT box by less than the predetermined threshold, (i) the learning device does not perform the backpropagation using said other classification results corresponding to said other GT label sets not including the annotation information on the specific class and (ii) the learning device performs the backpropagation to allow the specific classification result corresponding to the specific GT label set including the annotation information on the specific class to be classified as the background.

As one example, only at least one class belonging to each of the categories is annotated as its class per se in each of the GT label sets, and at least one class belonging to one of other categories is annotated as the background in each of the GT label sets.

As one example, at the step of (a), when receiving a request for learning the CNN capable of classifying a new class other than the classes included in the first to the n-th databases for training, the learning device further obtains (i) a new (n+1)-th image data set including new images including objects for the new class and (ii) a new (n+1)-th GT label set to which annotation information for the new class has been granted, to thereby establish a new ((n+1)-th database for training.

In accordance with another aspect of the present invention, there provided a testing method by using a convolutional neural network (CNN) for a test image, including steps of: (a) a testing device obtaining at least one test image, on condition that a learning device has performed processes of (I) establishing a first to an n-th databases for training, respectively including (i) image data sets for training by categories, which are obtained by classifying training images for a plurality of classes of a plurality of objects for training by the categories, and (ii) ground truth (GT) label sets by the categories, which are generated by checking each of the objects for training included in each of the training images included in each of the image data sets for training and by granting, if each of the objects for training corresponds to a class belonging its corresponding category, each information annotated as it corresponding class to each of the objects for training, wherein each of the GT label sets corresponds to each of the image data sets for training; (II) receiving at least one specific training image belonging to a specific image data set for training corresponding to a specific class among the n databases for training, and generating at least one feature map for training by applying at least one convolution operation to the training image, then generating classification results for training, by the categories, corresponding to at least one specific object for training included in the training image based on the obtained feature map for training, wherein the training image includes the specific object for training corresponding to the specific class for training; and (III) learning at least one parameter of the CNN by using losses by the categories, which are obtained by referring to classification results for training by the categories and their corresponding GT values of the GT label sets by the categories; and (b) the testing device generating classification results for testing corresponding to at least one class of at least one object for testing included in the test image by using the CNN.

As one example, at the process of (III), the learning device has calculated classification losses by the categories by referring to the classification results for training and their corresponding GT values of the GT label sets by the categories, to thereby allow backproprogation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class training as a background.

As one example, at the process of (II), the learning device has further obtained a box result for training which represents information on a detected location of the specific object for training, wherein, at the process of (III), the learning device has further calculated a box loss by referring to the box result for training and its corresponding GT box, to thereby perform backpropagation.

As one example, at the process of (II), the learning device has further obtained a box result for training which represents information on a detected location of the specific object for training, wherein, at the process of (III), if it is determined that the box result for training overlaps with a GT box by a predetermined threshold or more, the learning device has calculated a box loss by referring to the box result for training and its corresponding GT box, and calculates the classification losses by referring to the classification results for training and their corresponding CT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background, and wherein, at the process of (III), if it is determined that the box result for training overlaps with the GT box by less than the predetermined threshold, the learning device has calculated a specific classification loss, which is obtained by referring to (i) the specific classification result for training corresponding to the specific GT label set including the annotation information on the specific class for training among the classification results for training by the categories and (ii) its corresponding GT value within the specific GT label set, to thereby allow backpropagation to be performed to learn the parameter of the CNN so that the specific classification result for training is classified as the background.

As one example, at the process of (III), if it is determined that the box result for training overlaps with the GT box by less than the predetermined threshold, (III-1) the learning device has not performed the backpropagation using said other classification results for training corresponding to said other GT label sets not including the annotation information on the specific class and (III-2) the learning device has performed the backpropagation to allow the specific classification result for training corresponding to the specific GT label set including the annotation information on the specific class for training to be classified as the background.

As one example, only at least one class belonging to each of the categories is annotated as its class per se in each of the GT label sets, and at least one class belonging to one of other categories is annotated as the background in each of the GT label sets.

As one example, at the process of (I), when receiving a request for learning the CNN capable of classifying a new class other than the classes included in the first to the n-th databases for training, the learning device has further obtained (i) a new (n+1)-th image data set for training including new images including objects for training for the new class and (ii) a new (n+1)-th GT label set to which annotation information for the new class has been granted, to thereby establish a new (n+1)-th database for training.

In accordance with still another aspect of the present invention, there is provided a learning device for learning convolutional neural network (CNN) using a plurality of labeled databases having different label sets, including: a communication part for receiving, as at least one input image, at least one specific image belonging to a specific image data set corresponding to a specific class among the n databases for training, which is a first to an n-th databases for training, respectively including (i) image data sets by categories, which are obtained by classifying images for a plurality of classes of a plurality of objects by the categories, and (ii) ground truth (GT) label sets by the categories, which are generated by checking each of the objects in each of the images included in each of the image data sets and by granting, if each of the objects corresponds to a class belonging to its corresponding category, each information annotated as its corresponding class to each of the objects, wherein each of the GT label sets corresponds to each of the image data sets; and a processor for performing processes of (I) generating at least one feature map by applying at least one convolution operation to the input image, then generating classification results, by the categories, corresponding to at least one specific object included in the input image based on the feature map, wherein the input image includes the specific object corresponding the specific class, and (II) learning at least one parameter of the CNN by using losses by the categories, which are obtained by referring to the classification results by the categories and their corresponding GT values of the GT label sets by the categories.

As one example, the process of (II), the processor calculates classification losses by the categories by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background.

As one example, the process of (I), the processor further obtains a box result which represents information on a detected location of the specific object, wherein, at the process of (II), the processor further calculates a box loss by referring to the box result and its corresponding GT box, to thereby perform backpropagation.

As one example, at the process of (I), the processor further obtains a box result which represents information on a detected location of the specific object, wherein, at the process of (II), if it is determined that the box result overlaps with a GT box by a predetermined threshold or more, the processor calculates a box loss by referring to the result and its corresponding GT box, and calculates the classification losses by referring to the classification results and their corresponding GT values of the GT label sets by the categories, to thereby allow backpropagation to be performed to learn the parameter of the CNN so that the processor determines a specific classification result corresponding to a specific GT label set including annotation information on the specific class as the specific class and (ii) the processor determines one or more other classification results corresponding to one or more other GT label sets not including annotation information on the specific class as a background, and wherein, at the process of (II), if it is determined that the box result overlaps with the GT box by less than the predetermined threshold, the processor calculates a specific classification loss, which is obtained by referring to (i) the specific classification result corresponding to the specific GT label set including the annotation information on the specific class among the classification results by the categories and (ii) its corresponding GT value within the specific GT label set, to thereby allow backpropagation to be performed to learn the parameter of the CNN so that the specific classification result is classified as the background.

As one example, the predetermined threshold represents a condition that an I.O.U. (intersection over union) is 0.5.

As one example, at the process of (II), if it is determined that the box result overlaps with the GT box by less than the predetermined threshold, (i) the processor does not perform the backpropagation using said other classification results corresponding to said other GT label sets not including the annotation information on the specific class and (ii) the processor performs the backpropagation to allow the specific classification result corresponding to the specific GT label set including the annotation information on the specific class to be classified as the background.

As one example, only at least one class belonging to each of the categories is annotated as its class per se in each of the GT label sets, and at least one class belonging to one of other categories is annotated as the background in each of the GT label sets.

As one example, when receiving a request for learning the CNN capable of classifying a new class other than the classes included in the first to the n-th databases for training, the communication part further obtains (i) a new (n+1)-th image data set including new images including objects for the new class and (ii) a new (n+1)-th GT label set to which annotation information for the new class has been granted, to thereby establish a new (n+1)-th database for training.

In accordance with still yet another aspect of the present invention, there is provided a testing device by using a convolutional neural network (CNN) for a test image, including: a communication part for obtaining at least one test image, on condition that a learning device has performed processes of (I) establishing a first to an n-th databases for training, respectively including (i) image data sets for training by categories, which are obtained by classifying training images for a plurality of classes of a plurality of objects for training by the categories, and (ii) ground truth (GT) label sets by the categories, which are generated by checking each of the objects for training included in each of the training images included in each of the image data sets for training and by granting, if each of the objects for training corresponds to a class belonging to its corresponding category, each information annotated as its corresponding class to each of the objects for training, wherein each of the GT label sets corresponds to each of the image data sets for training; (II) receiving at least one specific training image belonging to a specific image data set for training corresponding to a specific class among the n databases for training, and generating at least one feature map for training by applying at least one convolution operation to the training image, then generating classification results for training, by the categories, corresponding to at least one specific object for training included in the training image based on the obtained feature map for training, wherein the training image includes the specific object for training corresponding to the specific class for training; and (III) learning at least one parameter of the CNN by using losses by the categories, which are obtained by referring to classification results for training by the categories and their corresponding GT values of the GT label sets by the categories; and a processor performing processes of generating classification results for testing corresponding to at least one class of at least one object for testing included in the test image by using the CNN.

As one example, at the process of (III), the learning device has calculated classification losses by the categories by referring to the classification results for training and their corresponding GT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background.

As one example, at the process of (II), the learning device has further obtained a box result for training which represents information on a detected location of the specific object for training, wherein, at the process of (III), the learning device has further calculated a box loss by referring to the box result for training and its corresponding GT box, to thereby perform backpropagation.

As one example, at the process of (II), the learning device has further obtained a box result for training which represents information on a detected location of the specific object for training, wherein, at the process of (III), if it is determined that the box result for training overlaps with a GT box by a predetermined threshold or more, the learning device has calculated a box loss by referring to the box result for training and its corresponding GT box, and calculates the classification losses by referring to the classification results for training their corresponding GT values of the GT label sets by the categories, to thereby allow backpropagation to be performed to learn the parameter of the CNN so that (III-1) the learning device has determined a specific classification result for training corresponding to specific GT label set including annotation information on the specific class for training as the specific class for training and (III-2) the learning device has determined one or more other classification results for training corresponding to one more other GT label sets not including annotation information on the specific class for training as a background, and wherein, at the process of (III), if it is determined that the box result for training overlaps with the GT box by less than the predetermined threshold, the learning device has calculated a specific classification loss, which is obtained by referring to (i) the specific classification result for training corresponding to the specific GT label set including the annotation information on the specific class for training among the classification results for training by the categories and (ii) its corresponding GT value within the specific GT label set, to thereby allow backpropagation to be performed to learn the parameter of the CNN so that the specific classification result for training is classified as the background.

As one example, at the process of (III), if it is determined that the box result for training overlaps with the GT box by less than the predetermined threshold, (III-1) the learning device has not performed the backpropagation using said other classification results for training corresponding to said other GT label sets not including the annotation information on the specific class and (III-2) the learning device has performed the backpropagation to allow the specific classification result for training corresponding to the specific GT label set including the annotation information on the specific class for training to be classified as the background.

As one example, only at least one class belonging to each of the categories is annotated as its class per se in each of the GT label sets, and at least one class belonging to one of other categories is annotated as the background in each of the GT label sets.

As one example, at the process of (I), when receiving a request for learning the CNN capable of classifying a new class other than the classes included in the first to the n-th databases for training, the learning device has further obtained (i) a new (n+1)-th image data set for training including new images including objects for training for the new class and (ii) a new (n+1)-th GT label set to which annotation information for the new class has been granted, to thereby establish a new (n+1)-th database for training.

BRIEF DESCRIPTION OF THE DRAWINGS

The above and other objects and features of the present invention will become apparent from the following description of preferred embodiments given in conjunction with the accompanying drawings, in which:

FIG. 3 illustrates an example of data for training created by annotating all classes according to a conventional art.

DETAILED DESCRIPTION OF THE PREFERRED EMBODIMENTS

Figure 1:
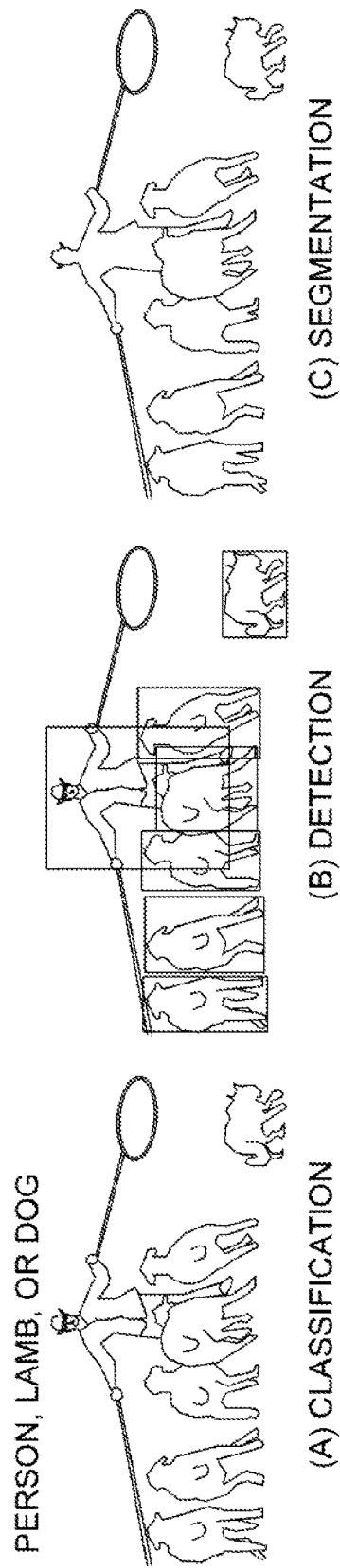
FIG. 1 illustrates examples of various outputs acquired from an image through a CNN according to a conventional art.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but the are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 4:
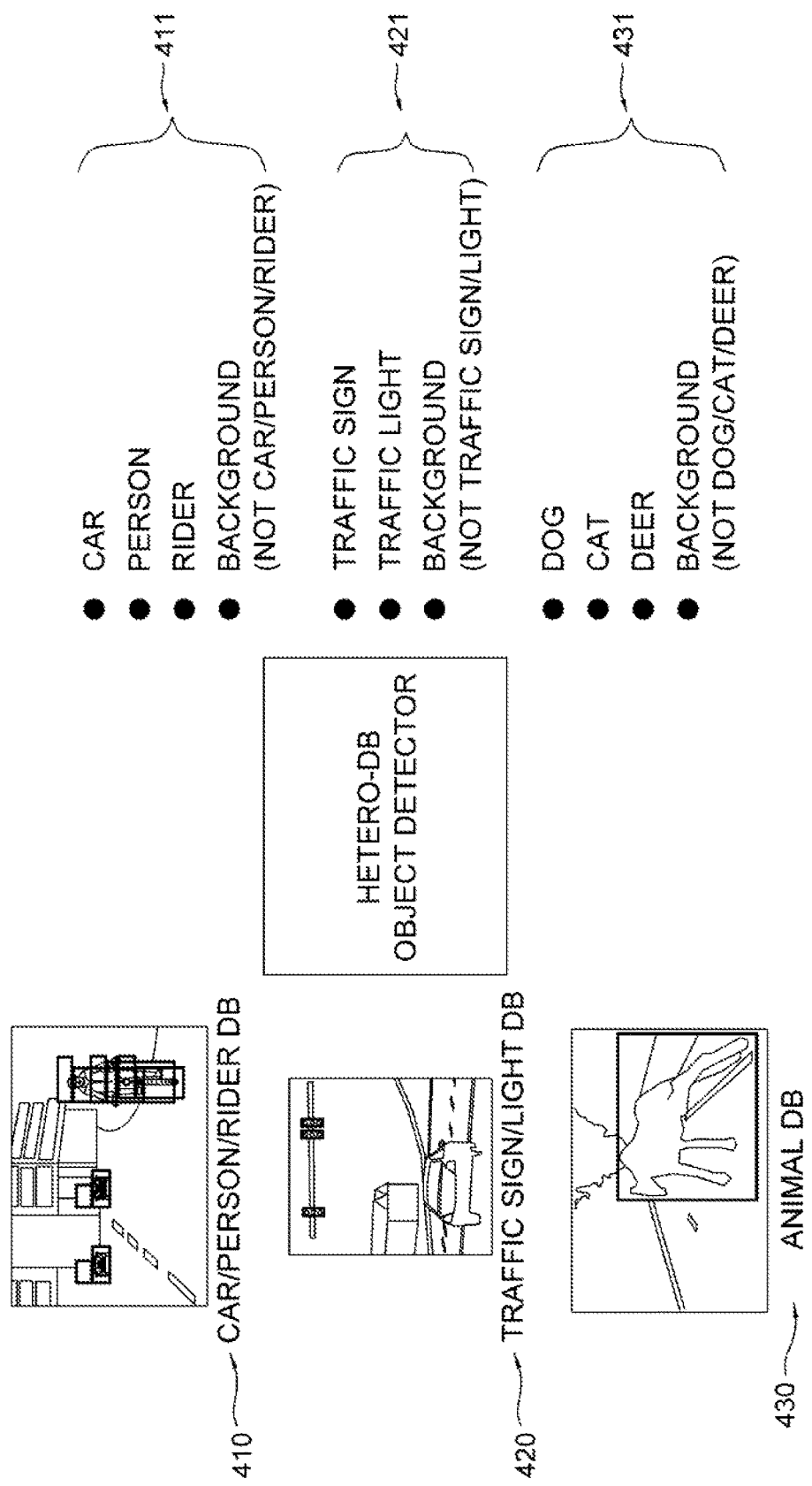
FIG. 4 illustrates respective databases prepared by categories classifying images by the categories and annotating classes of objects in the images by the categories in accordance with the present invention.
Figure 5:
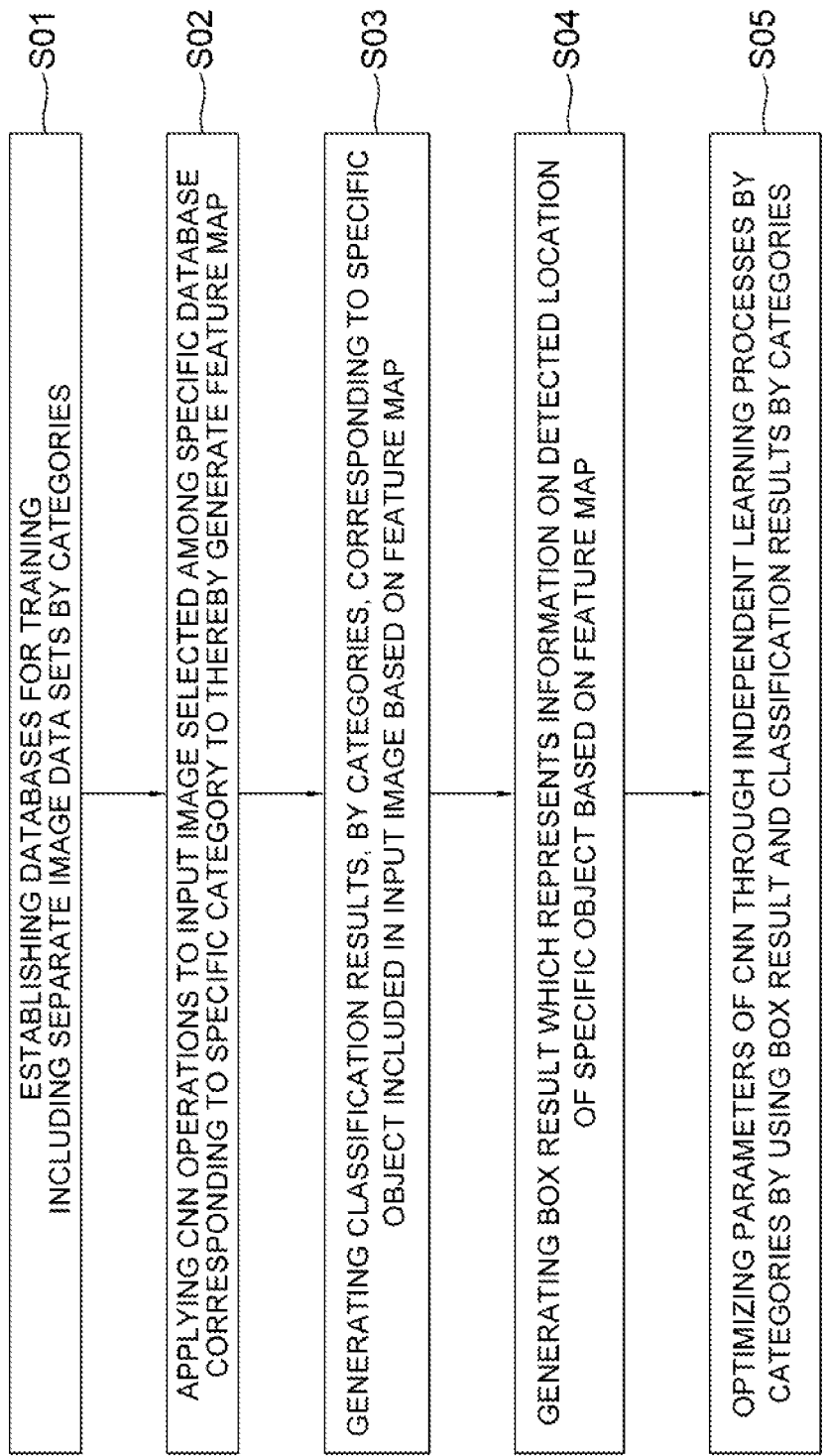
FIG. 5 illustrates a learning process using the respective databases in accordance with the present invention.

FIG. 4 illustrates respective databases prepared by categories by classifying images by the categories and annotating classes of objects in the images by the categories in accordance with the present invention and FIG. 5 illustrates a learning process using the respective databases in accordance with the present invention.

Referring to FIG. 4, a plurality of databases for training in accordance with the present invention include image data sets by the categories, which are obtained classifying images for a plurality of classes of a plurality of objects by the categories. For example, the image data sets by the categories are classified into (i) a first image data set including images of a category including classes such as a car, a person and a rider, (ii) a second image data set including images of a category including classes such as a traffic sign and a traffic light, and (iii) a third image data set including images of a category including classes such as a dog, a cat, and a deer. Herein, the number of databases for training is not limited to these examples.

Further, ground truth (GT) label sets by the categories of FIG. 4 include label images annotated by a person for each class, and the GT label sets are also classified to correspond to the image data sets by the categories. Namely, the ground truth (GT) label sets by the categories are generated by checking each of objects in each of the images included in each of the image data sets and by granting, if each of the objects corresponds to a class belonging to its corresponding category, each information annotated as its corresponding class to each of the objects. Herein, each of the GT label sets corresponds to each of the image data sets. For example, (i) in case of images belonging to the first image data set, only the classes belonging to the category including classes such as a car, a person and a rider are annotated, and the classes (e.g., a traffic sign, a traffic light, a dog, a cat, deer, etc.) of other categories are not annotated, (ii) in case of images belonging to the second image data set, only the classes belonging to the category including classes such as a traffic sign and a traffic light are annotated, and the classes (e.g., a car, a person, a rider, a dog, a cat, deer, etc.) of other categories are not annotated, and (iii) in case of images belonging to the third image data set, only the classes belonging to the category including classes such as a dog, a cat, and a deer are annotated, and the classes (e.g., a car, a person, a rider, a traffic sign, a traffic light, etc.) of other categories are not annotated. That is, if there are n categories, a first to an n-th GT label sets are required. In this way, the image data sets by the categories and their corresponding GT label sets by the categories allow a first to an n-th databases for training by the categories to be established.

As another example, with respect to a specific image, classes belonging to a specific category may be annotated as their corresponding classes per se, and the other categories may be annotated as a background. Further, n GT label sets may be generated for one image and then the n GT label sets may be classified by the categories. Herein, in a specific GT label set of the specific category, only a specific class of a specific object may be annotated, and in the GT label sets of the other categories, the specific object may be annotated as the background, to thereby form the GT label sets by the categories.

The GT label sets by the categories may correspond to class annotation groups by the categories as shown in the right side of FIG. 4. Namely, (i) the annotations 411 may be granted to the first image data set in a car/person/rider database 410, (ii) the annotations 421 may be granted to the second image data set in a traffic sign/light database 420, and (iii) the annotations 431 may be granted to the third image data set in an animal database 430.

When receiving a request for learning a new class other than the existing classes included in the first to the n-th databases for training in the state that the existing classes of the car/person/rider category, the traffic sign/light category, and the dog/cat/deer category have been learned, the learning device further obtains (i) a new (n+1)-th image data set including new images including objects for the new class and (ii) a new (n+1)-th GT label set to which annotation information for the new class has been granted, to thereby establish a new (n+1)-th database for training.

Hereinafter, a process of a detector performing a learning process by using the databases for training illustrated in FIG. 4 will be described by referring to FIG. 5.

Referring to FIG. 5, the learning method in accordance with the present invention includes establishing the databases for training including separate image data sets by the categories at a step of S01, applying CNN operations to an input image selected among a specific database corresponding to a specific category to thereby generate a feature map at a step of S02, generating classification results, by the categories, corresponding to at least one specific object included in the input image based on the feature map at. a step of S03, generating a box result which represents information on a detected location of the specific object based on the feature map at a step of S04, and optimizing one or more parameters of the CNN through independent learning processes by the categories by using the box result and the classification results by the categories at a step of S05.

Specifically, at the step of S01, the first to the n-th databases for training are established by the categories as illustrated in FIG. 4.

Figure 2:
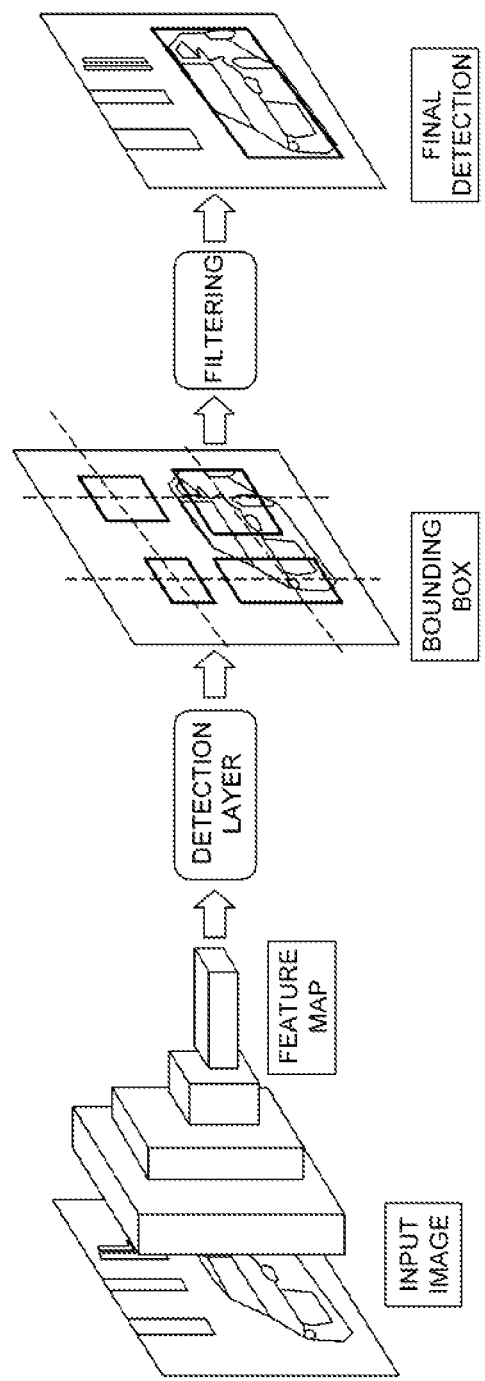
FIG. 2 is a diagram schematically illustrating a detection method by using the CNN according to a conventional art.

Thereafter, at the step of S02, the input image may be inputted to the CNN to thereby generate a feature map as illustrated in FIG. 2. For example, there may be a case in which a specific image belonging to a specific image data set in the traffic sign/light database 420 of FIG. 4 corresponding to the specific class is selected as the input image. Herein, the input image means an image including a specific object, e.g., a traffic light, corresponding to the specific class. Further, the learning device receives the input image and then applies a plurality of convolution operations through a plurality of convolutional filters (or convolutional layers) to thereby generate the feature map.

Figure 6:
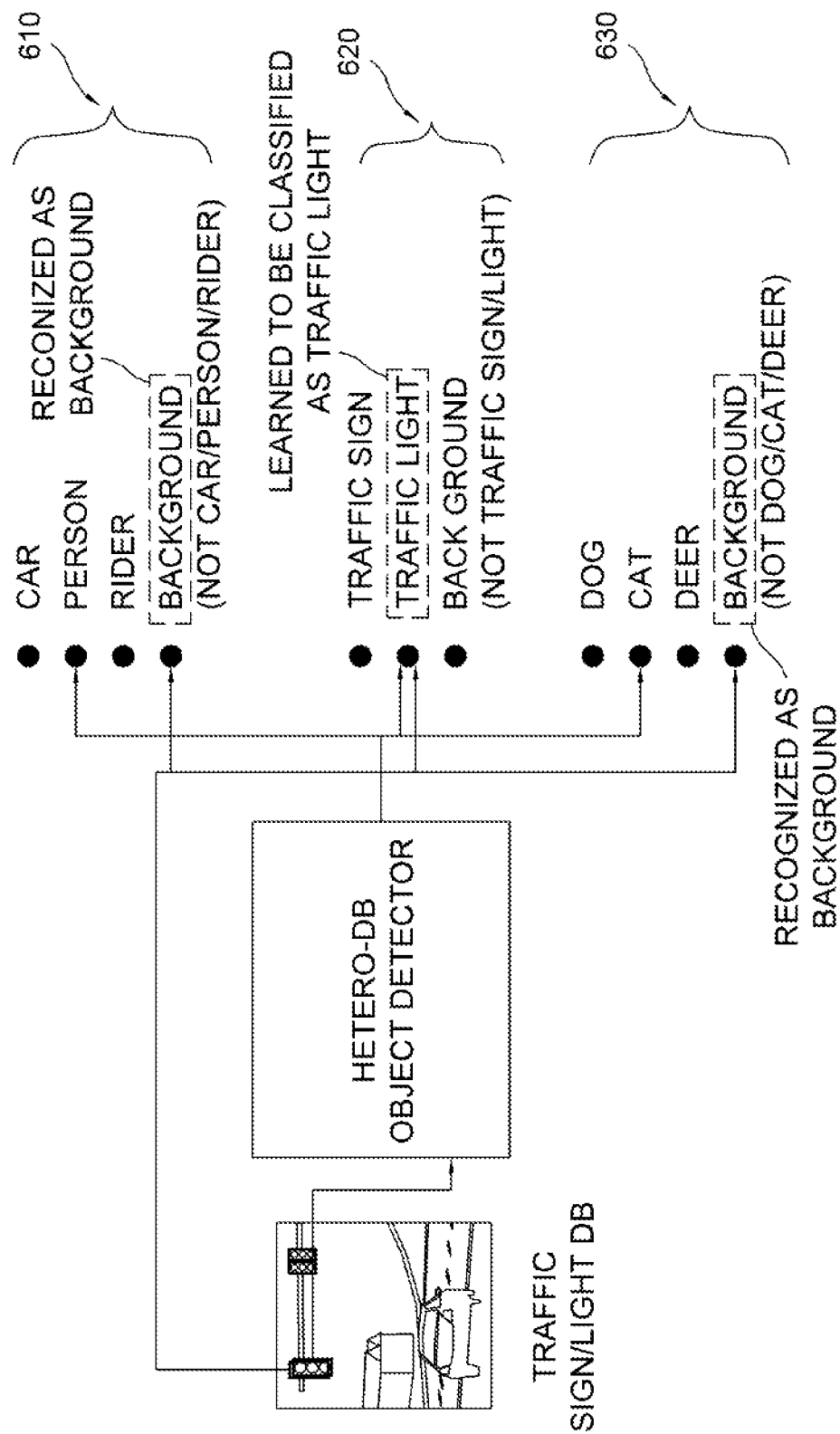
FIG. 6 illustrates an example of generating classification results in the learning process in accordance with the present invention.

At the step of S03, the classification results corresponding to the specific object included in the input image are generated by the categories as illustrated in FIG. 6. Specifically, as illustrated in FIG. 6, even though the input image has been selected from the traffic sign/light database, the object detector calculates not only a specific classification result to be used for being compared with a specific GT label set 620 corresponding to the car/person/rider database but also classification results to be used for being compared with other GT label sets 610, 630 respectively corresponding to (i) the animal database and the traffic sign/light database. That is, if the number of the databases for training is n, n classification results are outputted to be compared with the n GT label sets.

Further, at the step of S04, a plurality of bounding boxes are obtained by allowing the feature map to pass through the detection layer and then box results are obtained by allowing information on the bounding boxes to pass through the filtering layer.

Then, the step of S05 will be described in detail by referring to FIGS. 6 and 7.

Figure 7:
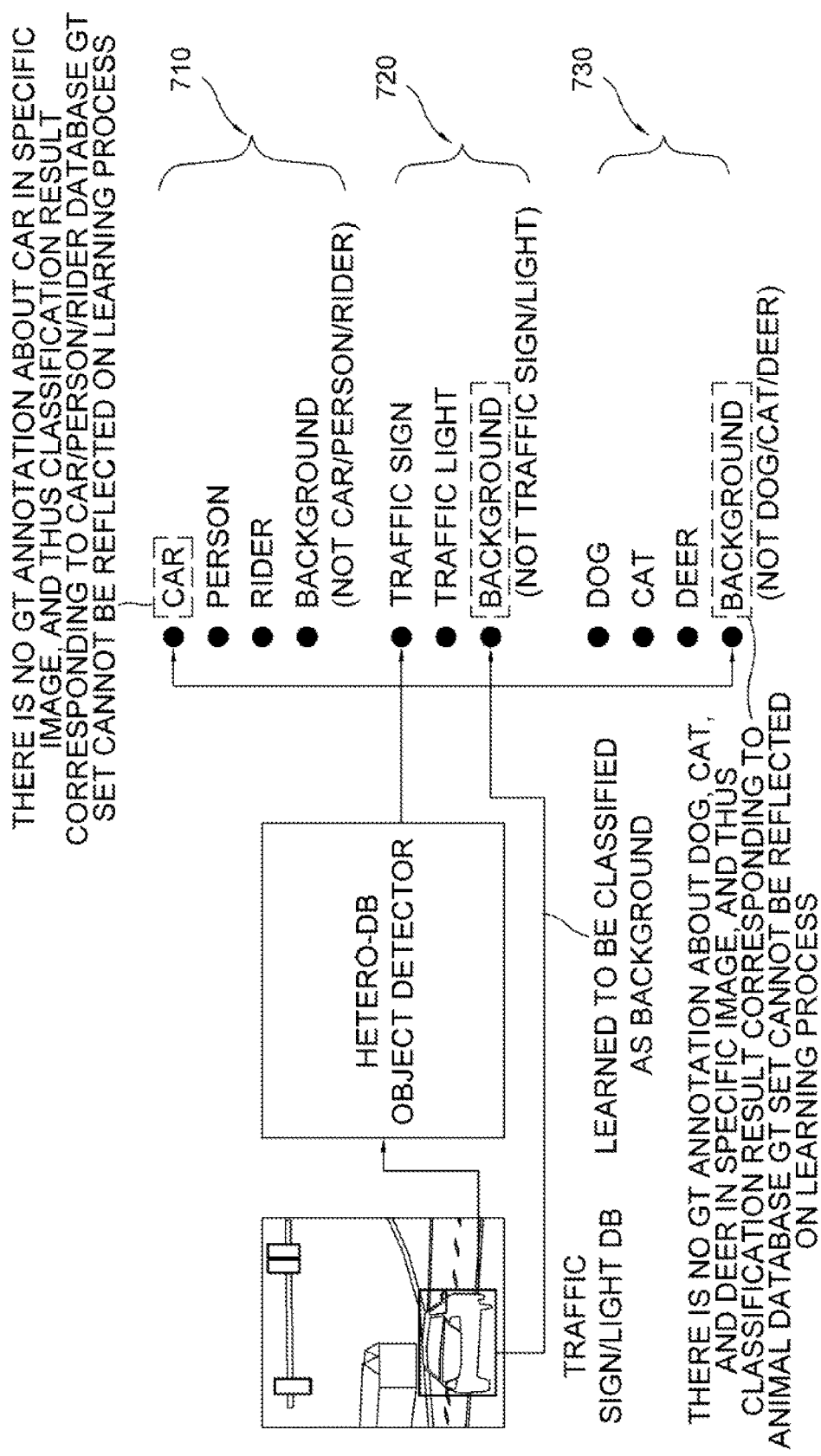
FIG. 7 illustrates another example of generating the classification results in the learning process in accordance with the present invention.

FIG. 6 illustrates an example of generating the classification results by the categories in the learning process in accordance with the present invention, and FIG. 7 illustrates another example of generating the classification results by the categories in the CNN learning process in accordance with the present invention.

First of all, FIG. 6 shows a case in which it is determined that the box result overlaps with a GT box by a predetermined threshold or more, and FIG. 7 shows a case in which it is determined that the box result overlaps with the GT box by less than the predetermined threshold. The two cases use different learning processes.

Herein, the predetermined threshold represents a condition that an I.O.U. (intersection over union) is 0.5. For example, if the box result overlaps with the GT box by 70%, the I.O.U. becomes 70/(30+70+30)=0.53.

FIG. 6 illustrates a case in which the box result appropriately detects the traffic light when an input image is inputted to learn the traffic light, and FIG. 7 illustrates a case in which the box result detects a wrong object, e.g., a car, not the traffic light, when an input image is inputted to learn the traffic light.

If it is determined that the box result overlaps with the GT box by the predetermined threshold or more, the learning device calculates a box loss by referring to the box result and its corresponding GT box, and calculates the classification losses by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background.

For example, as illustrated in FIG. 6, when an input image is inputted to learn the traffic light, if a classification result to be compared with the GT label set 610 corresponding to the car/person/rider database is determined as a person, it can be understood that the learning device has generated a wrong classification result because the traffic light should be recognized as the background as the classification result to be compared with the GT label set 610 corresponding to the car/person/rider database. Hence, since it is understood that the wrong classification result has been generated, a classification loss is calculated, and then the backpropagation is performed to allow a probability of the classification result, to be compared with the GT label set 610 corresponding to the car/person/rider database, being recognized as the background to be increased.

Further, if the classification result to be compared with the GT label set 620 corresponding to the traffic sign/light database is determined as a traffic light, it can be understood that the learning device has generated a right classification result. Hence, since it is understood that the right classification result has been generated, a classification loss is not calculated. If a wrong classification result has been generated, a classification loss may be calculated and then the backpropagation is performed to allow a probability of the classification result, to be compared with the GT label set 620 corresponding to the traffic sign/light database, being recognized as the traffic light to be increased.

Further, if the classification result to be compared with the GT label set 630 corresponding to the animal database is determined as a cat, it can be understood that the learning device has generated a wrong classification result because the traffic light should be recognized as the background as the classification result to be compared with the GT label set 630 corresponding to the animal database. Hence, since it is understood that the wrong classification result has been generated, a classification loss is calculated, and then the backpropagation is performed to allow a probability of the classification result, to be compared with the GT label set 630 corresponding to the animal database, being recognized as the background to be increased.

On the other hand, as shown in FIG. 7, if it is determined that the box result overlaps with the GT box by less than the predetermined threshold, it can be understood that the detector has attempted to search for a specific object at a wrong location and thus has detected a wrong object other than the specific object. For example, in FIG. 7, the car was wrongly detected instead of the traffic light. In such a case, the class of the wrong object in the box result detected by the CNN is not a subject of interest. That is, since the CNN has incorrectly predicted an area of the background as an area of the specific object, the learning device has guessed a wrong class. Thus, the backpropagation is performed to learn the parameter of the CNN so that the classification result is classified as the background.

For example, as illustrated in FIG. 7, when receiving an input image selected from the traffic light/sign database in order to learn the traffic light, the learning device should have detected the location of the traffic light through the regression. However, if the learning device has incorrectly detected the location of the car as the location of the traffic light, the learning process is performed in a manner that the penalty for incorrectly detecting the location of the car as that of the traffic light is not given. Hence, in accordance with one example embodiment of the present invention, as illustrated in FIG. 7, if it is determined that the box result overlaps with the GT box by less than the predetermined threshold, the box loss is calculated by referring to the box result and the GT box, and the backpropagation may be performed based on the box loss. As another example, when it is determined that the box result overlaps with the GT box by less than the predetermined threshold, the box loss may not be calculated. Further, the learning process is performed in such a manner that the area detected by the CNN does not relate to a right class but relates to the background.

When it is determined that the box result overlaps with the GT box by less than the predetermined threshold, if the input image is an image selected from the traffic sign/light database, an object, e.g., a car, detected by the CNN should be treated as the background in the GT label set 720 of the traffic sign/light database, and thus the classification result is compared with the classification GT by referring to the GT label set 720 of the traffic sign/light database to perform a learning process. That is, if a car or something else is incorrectly detected by the regression box although the traffic light should have been detected by the regression box, the classification result to be compared with the CT label set 720 of the traffic sign/light database may be classified as the background. However, if other GT label sets. 710 and 730 are referred to, the learning device does not know what the object in the image is (although the object is a car) and does not find its corresponding CT. Thus, the classification loss is not calculated and accordingly a learning process is not performed. Even if the learning device has detected the car in the image selected from the traffic sign/light database, according to the GT label sets 710 and 730, it is unclear what this object is, and thus in order not to affect a result of the existing learning process, for recognizing the car and the like, which has been completed by using other images selected from the car/person/rider database, the learning process is not performed by using the GT label sets 710 and 730 but instead the learning process is performed only by using the GT label set 720 of the traffic sign/light database. That is, the learning process is performed to allow a probability of the class, detected by referring to the GT label set 720 of the traffic sign/light database, being recognized as the background to be increased.

The learning process in case it is determined that the box result overlaps with the GT box by less than the predetermined threshold will be described as follows based on the example of FIG. 7. As a result of detecting an area in a specific image selected from the traffic sign/light database, a car area has been detected instead of the traffic light area. Then, the learning device found that (i) the classification result to be compared with the GT label set 710 corresponding to the car/person/rider database is most likely to be the car, (ii) the classification result to be compared with the GT label set 720 corresponding to the traffic sign/light database is most likely to be the traffic sign, and (iii) the classification result to be compared with the GT label set 730 corresponding to the animal database is most likely to be the background.

First, it is right that, the classification result to be compared with the GT label set 710 corresponding to the car/person/rider database is most likely to be the car. However, there is no GT annotation for the car in the specific image selected from the traffic sign/light database. Hence, even if the learning device appropriately found that the classification result is most likely to be the car, it cannot be known whether the detected class is the car or not because there is no GT annotation for the car in the specific image, and thus the classification result corresponding to the car/person/rider database GT set cannot be reflected on the learning process.

Likewise, if the specific image is an image selected from the traffic sign/light database, the learning device does not know whether the detected class is a dog, a cat or a deer with respect to the GT label set 730 corresponding to the animal database because there is no GT annotation about the dog, the cat, and the deer in the specific image, and thus the classification result corresponding to the animal database GT set cannot be reflected on the learning process.

It is certain that the box result is not the traffic sign/traffic light because there is only the GT annotation for the traffic sign and the traffic light in the specific image selected from the traffic sign/light database and because objects other than the traffic sign and the traffic light are regarded as the background. Hence, this information is reflected on the learning process. That is, it is wrong that the traffic sign leas been detected as the classification result to be compared with the GT label set 720 corresponding to the traffic sign/light database, because the classification result should have been recognized as the background. Hence, a classification loss is calculated.

Likewise, the learning device accordance with the resent invention uses the databases for training separately provided by the categories to thereby allow an efficient learning process to be performed because, even if a new class to be learned is added, it is sufficient to additionally learn images for the newly added class. Further, when learning only the newly added learning data, the previously learned parameters are not damaged to thereby obtain a learning capability of detecting the new class.

If the parameters of the learning device are optimized through the learning process, an object is detected from the actually inputted test image by using the test device including the CNN with the optimized parameters. Namely, in road-driving image acquired from an autonomous driving vehicle, etc., classification and detection for at least one object may be performed.

It would be understood by one of ordinary skill in the art that a transmission and/or a reception of toe above-described images, i.e., image data such as the training image and the test image, can be performed by a communication unit of the learning device and the testing device, and the processes of the convolution operation, the deconvolution operation and the loss value operation can be mainly performed by the processor of the learning device and the testing device, but the present invention is not limited to these examples.

The present invention has an effect of allowing an efficient learning process to be performed because the learning device uses the databases for training separately provided by the categories because it is sufficient to additionally learn images for a newly added class only and learn the databases in which only the newly added class is annotated.

The invention has another effect of efficiently obtaining a learning capability of detecting the new class without affecting the previously learned parameters of the CNN when learning only the newly added training data.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present intention and they can do the same in the opposite case.

As seen above, the present invention has been explained specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of thought of the present invention.

What is claimed is:

1. A method for learning convolutional neural network (CNN) by using a plurality of labeled databases having different label sets, comprising steps of:
    (a) a learning device establishing a first to an n-th databases for training, respectively including (i) image data sets by categories, which are obtained by classifying images for a plurality of classes of a plurality of objects by the categories, and (ii) ground truth (GT) label sets by the categories, which are generated by checking each of the objects in each of the images included in each of the image data sets and by granting, if each of the objects corresponds to a class belonging to its corresponding category, each information annotated as its corresponding class to each of the objects, wherein each of the GT label sets corresponds to each of the image data sets;
    (b) the learning device receiving, as at least one input image, at least one specific image belonging to a specific image data set corresponding to a specific class among the n databases for training, and generating at least one feature map by applying at least one convolution operation to the input image, then generating classification results, by the categories, corresponding to at least one specific object included in the input image based on the feature map, wherein the input image includes the specific object corresponding to the specific class; and
    (c) the learning device learning at least one parameter of the CNN by using losses by the categories, which are obtained by referring to the classification results by the categories and their corresponding GT values of the GT label sets by the categories, wherein, the learning device calculates classification losses by the categories by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background.

2. The method of claim 1, wherein, at the step of (b), the learning device further obtains a box result which represents information on a detected location of the specific object, and
    wherein, at the step of (c), the learning device further calculates a box loss by referring to the box result and its corresponding GT box, to thereby perform backpropagation.

3. The method of claim 1, wherein, at the step of (b), the learning device further obtains a box result which represents information on a detected location of the specific object, wherein, at the step of (c), if it is determined that the box result overlaps with a GT box by a predetermined threshold or more, the learning device calculates a box loss by referring to the box result and its corresponding GT box, and calculates the classification losses by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background, and wherein, at the step of (c), if it is determined that the box result overlaps with the GT box by less than the predetermined threshold, the learning device calculates a specific classification loss, which is obtained by referring to (i) the specific classification result corresponding to the specific GT label set including the annotation information on the specific class among the classification results by the categories and (ii) its corresponding GT value within the specific GT label set, to thereby allow backpropagation to be performed to learn the parameter of the CNN so that the specific classification result is classified as the background.

4. The method of claim 3, wherein the predetermined threshold represents a condition that an I.O.U (intersection over union) is 0.5.

5. The method of claim 3, wherein, at the step of (C), if it is determined that the box result overlaps with the GT box by less than the predetermined threshold, (i) the learning device does not perform the backpropagation using said other classification results corresponding to said other GT label sets not including the annotation information on the specific class and (ii) the learning device performs the backpropagation to allow the specific classification result corresponding to the specific GT label set including the annotation information on the specific class to be classified as the background.

6. The method of claim 1, wherein only at least one class belonging to each of the categories is annotated as its class per se in each of the GT label sets, and at least one class belonging to one of other categories is annotated as the background in each of the GT label sets.

7. The method of claim 1, wherein, at the step of (a), when receiving a request for learning the CNN capable of classifying a new class other than the classes included in the first to the n-th databases for training, the learning device further obtains (i) a new (n+1)-th image data set including new images including objects for the new class and (ii) a new (n+1)-th GT label set to which annotation information for the new class has been granted, to thereby establish a new (n+1)-th database for training.

8. A testing method by using a convolutional neural network (CNN) for a test image, comprising steps of:

(a) a testing device obtaining at least one test image, after a learning device has performed processes of (I) establishing a first to an n-th databases for training, respectively including (i) image data sets for training by categories, which are obtained by classifying training images for a plurality of classes of a plurality of objects for training by the categories, and (ii) ground truth (GT) label sets by the categories, which are generated by checking each of the objects for training included in each of the training images included in each of the image data sets for training and by granting, if each of the objects for training corresponds to a class belonging to its corresponding category, each information annotated as its corresponding class to each of the objects for training, wherein each of the GT label sets corresponds to each of the image data sets for training; (II) receiving at least one specific training image belonging to a specific image data set for training corresponding to a specific class among the n databases for training, and generating at least one feature map for training by applying at least one convolution operation to the training image, then generating classification results for training, by the categories, corresponding to at least one specific object for training included in the training image based on the obtained feature map for training, wherein the training image includes the specific object for training corresponding to the specific class for training; and (III) learning at least one parameter of the CNN by using losses by the categories, which are obtained by referring to classification results for training by the categories and their corresponding GT values of the GT label sets by the categories; and (b) the testing device generating classification results for testing corresponding to at least one class of at least one object for testing included in the test image by using the CNN, wherein, at the process of (III), the learning device has calculated classification losses by the categories by referring to the classification results for training and their corresponding GT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background.

9. The method of claim 8, wherein, at the process of (II), the learning device has further obtained a box result for training which represents information on a detected location of the specific object for training, and wherein, at the process of (III), the learning device has further calculated a box loss by referring to the box result for training and its corresponding GT box, to thereby perform backpropagation.

10. The method of claim 8, wherein, at the process of (II), the learning device has further obtained a box result for training which represents information on a detected location of the specific object for training, wherein, at the process of (III), if it is determined that the box result for training overlaps with a GT box by a predetermined threshold or more, the learning device has calculated a box loss by referring to the box result for training and its corresponding GT box, and calculates the classification losses by referring to the classification results for training and their corresponding GT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background, and wherein, at the process of (III), if it is determined that the box result for training overlaps with the GT box by less than the predetermined threshold, the learning device has calculated a specific classification loss, which is obtained by referring to (i) the specific classification result for training corresponding to the specific GT label set including the annotation information on the specific class for training among the classification results for training by the categories and (ii) its corresponding GT value within the specific GT label set, to thereby allow backpropagation to be performed to learn the parameter of the CNN so that the specific classification result for training is classified as the background.

11. The method of claim 10, wherein, at the process of (III), if it is determined that the box result for training overlaps with the GT box by less than the predetermined threshold, (III-1) the learning device has not performed the backpropagation using said other classification results for training corresponding to said other GT label sets not including the annotation information on the specific class and (III-2) the learning device has performed the backpropagation to allow the specific classification result for training corresponding to the specific GT label set including the annotation information on the specific class for training to be classified as the background.

12. The method of claim 8, wherein only at least one class belonging to each of the categories is annotated as its class per se in each of the GT label sets, and at least one class belonging to one of other categories is annotated as the background in each of the GT label sets.

13. The method of claim 8, wherein, at the process of (I), when receiving a request for learning the CNN capable of classifying a new class other than the classes included in the first to the n-th databases for training, the learning device has further obtained (i) a new (n+1)-th image data set for training including new images including objects for training for the new class and (ii) a new (n+1)-th GT label set to which annotation information for the new class has been granted, to thereby establish a new (n+1)-th database for training.

14. A learning device for learning convolutional neural network (CNN) by using a plurality of labeled databases having different label sets, comprising:

an interface configured to receive, as at least one input image, at least one specific image belonging to a specific image data set corresponding to a specific class among the n databases for training, which is a first to an n-th databases for training, respectively including (i) image data sets by categories, which are obtained by classifying images for a plurality of classes of a plurality of objects by the categories, and (ii) ground truth (GT) label sets by the categories, which are generated by checking each of the objects in each of the images included in each of the image data sets and by granting, if each of the objects corresponds to a class belonging to its corresponding category, each information annotated as its corresponding class to each of the objects, wherein each of the GT label sets corresponds to each of the image data sets; and a processor for performing processes of (I) generating at least one feature map by applying at least one convolution operation to the input image, then generating classification results, by the categories, corresponding to at least one specific object included in the input image based on the feature map, wherein the input image includes the specific object corresponding to the specific class, and (II) learning at least one parameter of the CNN by using losses by the categories, which are obtained by referring to the classification results by the categories and their corresponding GT values of the GT label sets by the categories, wherein, at the process of (II), the processor calculates classification losses by the categories by referring to the classification results and their corresponding GT values of the GT label sets by the categories, to thereby allow backpropagation to be performed to learn the parameter of the CNN so that (i) the learning device determines a specific classification result corresponding to a specific GT label set including annotation information on the specific class as the specific class and (ii) the learning device determines one or more other classification results corresponding to one or more other GT label sets not including annotation information on the specific class as a background.

15. The learning device of claim 14, wherein, at the process of (I), the processor further obtains a box result which represents information on a detected location of the specific object, and wherein, at the process of (II), the processor further calculates a box loss by referring to the box result and its corresponding GT box, to thereby perform backpropagation.

16. The learning device of claim 14, wherein, at the process of (I), the processor further obtains a box result which represents information on a detected location of the specific object, wherein, at the process of (II), if it is determined that the box result overlaps with a GT box by a predetermined threshold or more, the processor calculates a box loss by referring to the box result and its corresponding GT box, and calculates the classification losses by referring to the classification results and their corresponding GT values of the GT label sets by the categories, to thereby allow backpropagation to be performed to learn the parameter of the CNN so that (i) the processor determines a specific classification result corresponding to a specific GT label set including annotation information on the specific class as the specific class and (ii) the processor determines one or more other classification results corresponding to one or more other GT label sets not including annotation information on the specific class as a background, and wherein, at the process of (II), if it is determined that the box result overlaps with the GT box by less than the predetermined threshold, the processor calculates a specific classification loss, which is obtained by referring to (i) the specific classification result corresponding to the specific GT label set including the annotation information on the specific class among the classification results by the categories and (ii) its corresponding GT value within the specific GT label set, to thereby allow backpropagation to be performed to learn the parameter of the CNN so that the specific classification result is classified as the background.

17. The learning device of claim 16, wherein the predetermined threshold represents a condition that an I.O.U (intersection over union) is 0.5.

18. The learning device of claim 16, wherein, at the process of (II), if it is determined that the box result overlaps with the GT box by less than the predetermined threshold, (i) the processor does not perform the backpropagation using said other classification results corresponding to said other GT label sets not including the annotation information on the specific class and (ii) the processor performs the backpropagation to allow the specific classification result corresponding to the specific GT label set including the annotation information on the specific class to be classified as the background.

19. The learning device of claim 14, wherein only at least one class belonging to each of the categories is annotated as its class per se in each of the GT label sets, and at least one class belonging to one of other categories is annotated as the background in each of the GT label sets.

20. The learning device of claim 14, wherein, when receiving a request for learning the CNN capable of classifying a new class other than the classes included in the first to the n-th databases for training, the communication part further obtains (i) a new (n+1)-th image data set including new images including objects for the new class and (ii) a new (n+1)-th GT label set to which annotation information for the new class has been granted, to thereby establish a new (n+1)-th database for training.

21. A testing device by using a convolutional neural network (CNN) for a test image, comprising:
an interface through with at least one test image is obtained, after a learning device has performed processes of (I) establishing a first to an n-th databases for training, respectively including (i) image data sets for training by categories, which are obtained by classifying training images for a plurality of classes of a plurality of objects for training by the categories, and (ii) ground truth (GT) label sets by the categories, which are generated by checking each of the objects for training included in each of the training images included in each of the image data sets for training and by granting, if each of the objects for training corresponds to a class belonging to its corresponding category, each information annotated as its corresponding class to each of the objects for training, wherein each of the GT label sets corresponds to each of the image data sets for training; (II) receiving at least one specific training image belonging to a specific image data set for training corresponding to a specific class among the n databases for training, and generating at least one feature map for training by applying at least one convolution operation to the training image, then generating classification results for training, by the categories, corresponding to at least one specific object for training included in the training image based on the obtained feature map for training, wherein the training image includes the specific object for training corresponding to the specific class for training; and (III) learning at least one parameter of the CNN by using losses by the categories, which are obtained by referring to classification results for training by the categories and their corresponding GT values of the GT label sets by the categories; and
a processor for performing processes of generating classification results for testing corresponding to at least one class of at least one object for testing included in the test image by using the CNN, wherein, at the process of (III), the learning device has calculated classification losses by the categories by referring to the classification results for training and their corresponding GT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background.

22. The testing device of claim 21, wherein, at the process of (II), the learning device has further obtained a box result for training which represents information on a detected location of the specific object for training, and
wherein, at the process of (III), the learning device has further calculated a box loss by referring to the box result for training and its corresponding GT box, to thereby perform backpropagation.

23. The testing device of claim 21, wherein, at the process of (II), the learning device has further obtained a box result for training which represents information on a detected location of the specific object for training,
wherein, at the process of (III), if it is determined that the box result for training overlaps with a GT box by a predetermined threshold or more, the learning device has calculated a box loss by referring to the box result for training and its corresponding GT box, and calculates the classification losses by referring to the classification results for training and their corresponding GT values of the GT label sets by the categories, to thereby allow backpropagation to be performed to learn the parameter of the CNN so that (III-1) the learning device has determined a specific classification result for training corresponding to a specific GT label set including annotation information on the specific class for training as the specific class for training and (III-2) the learning device has determined one or more other classification results for training corresponding to one or more other GT label sets not including annotation information on the specific class for training as a background, and
wherein, at the process of (III), if it is determined that the box result for training overlaps with the GT box by less than the predetermined threshold, the learning device has calculated a specific classification loss, which is obtained by referring to (i) the specific classification result for training corresponding to the specific GT label set including the annotation information on the specific class for training among the classification results for training by the categories and (ii) its corresponding GT value within the specific GT label set, to thereby allow backpropagation to be performed to learn the parameter of the CNN so that the specific classification result for training is classified as the background.

24. The testing device of claim 23, wherein, at the process of (III), if it is determined that the box result for training overlaps with the GT box by less than the predetermined threshold, (III-1) the learning device has not performed the backpropagation using said other classification results for training corresponding to said other GT label sets not including the annotation information on the specific class and (III-2) the learning device has performed the backpropagation to allow the specific classification result for training corresponding to the specific GT label set including the annotation information on the specific class for training to be classified as the background.

25. The testing device of claim 21, wherein only at least one class belonging to each of the categories is annotated as its class per se in each of the GT label sets, and at least one class belonging to one of other categories is annotated as the background in each of the GT label sets.

26. The testing device of claim 24, wherein, at the process of (I), when receiving a request for learning the CNN capable of classifying a new class other than the classes included in the first to the n-th databases for training, the learning device has further obtained (i) a new (n+1)-th image data set for training including new images including objects for training for the new class and (ii) a new (n+1)-th GT label set to which annotation information for the new class has been granted, to thereby establish a new (n+1)-th database for training.

* * * * *